March 15, 1949. J. L. KWASH 2,464,644
MODERN CHICK FEED CONTAINER
Filed May 16, 1944

INVENTOR.
John L. Kwash
BY
Victor J. Evans & Co.
ATTORNEYS

Patented Mar. 15, 1949

2,464,644

UNITED STATES PATENT OFFICE 2,464,644

MODERN CHICK FEED CONTAINER

John L. Kwash, Biteley, Mich.

Application May 16, 1944, Serial No. 535,854

1 Claim. (Cl. 119—52)

The invention relates to a chick feeder, and more particularly to a poultry feed container.

The primary object of the invention is the provision of a container of this character, wherein feed, such as grain, corn, mash or the like can be readily and easily placed therein for delivery to poultry for the feeding thereof, especially small chicks, so that the latter will constantly have feed before them, until the contents has been practically consumed thereby.

Another object of the invention is the provision of a container of this character, wherein the same is readily and easily carried from one location to another, and is protected against weather elements, that is to say rain, sleet or the like, so that it is adapted to outside use, as well as inside of an enclosure.

A further object of the invention is the provision of a container of this character, wherein the loose feed is held intact, without liability of the chicks scratching the same, or scattering thereof, and in this manner avoiding undue waste, the container being light in weight and is preferably made from sheet metal cut and stamped into the required formation.

A still further object of the invention is the provision of a container of this character, wherein the poultry feed held therein is prevented from being contaminated with droppings, in that the poultry cannot stand in the feed or scatter the latter to be exposed to such droppings, the container being susceptible of ready and easy cleaning when the occasion requires.

A still further object of the invention is the provision of a container of this character, which is simple in construction, thoroughly reliable and efficient in its purposes, strong, durable, enabling mass storing of feed therein, and inexpensive to manufacture.

With these and other objects in view the invention consists in the features of construction, combination and arrangement of parts as will be hereinafter more fully described, illustrated in the accompanying drawing, which shows the preferred form of embodiment of the invention and pointed out in the claim hereunto appended.

In the accompanying drawing.

Similar reference characters indicate corresponding parts throughout the several views in the drawing.

Figure 1:
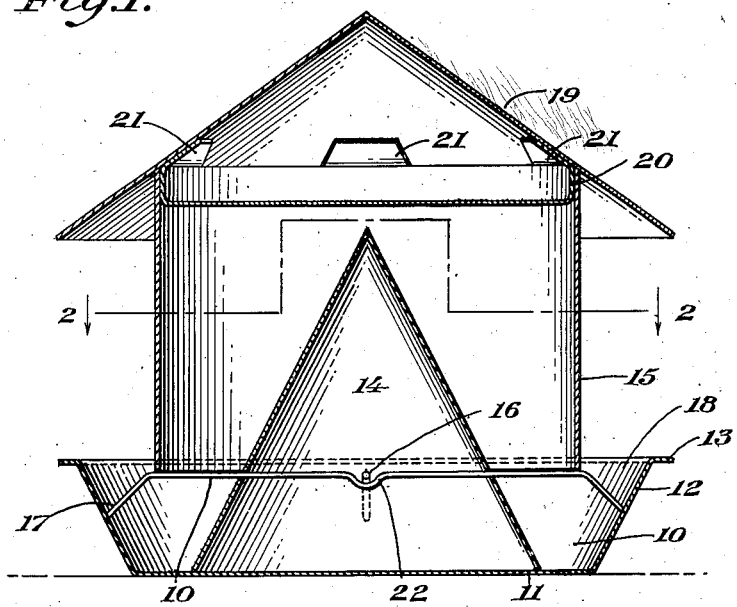
Figure 1 is a vertical sectional view through a container constructed in accordance with the iunvention.
Figure 2:
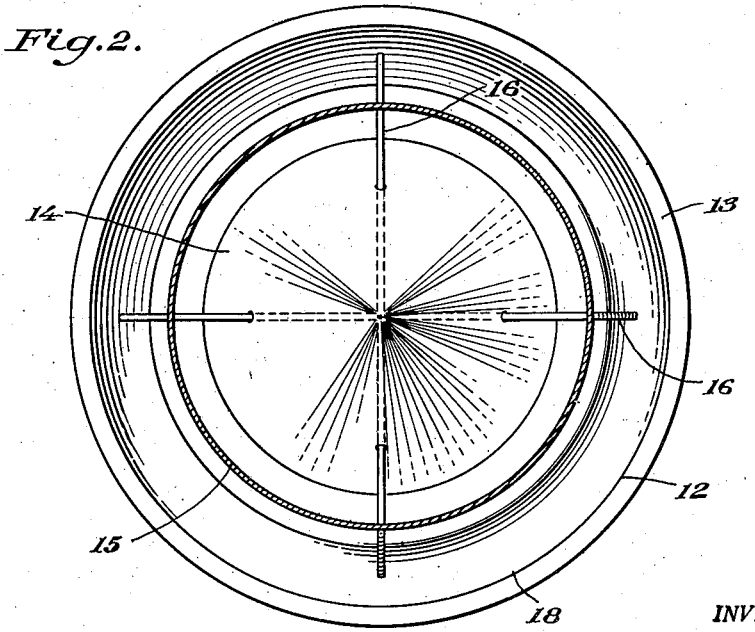
Figure 2 is a sectional view taken on the line 2—2 of Figure 1 looking in the direction of the arrows.

Referring to the drawings in detail the container comprises a circular base pan 10 having a flat bottom portion 11, and an upwardly flared outer marginal side wall 12, respectively. This side wall 12 at its top edge is provided with a narrow outturned annular flange 13 which lies in a horizontal plane when the pan is at rest with the top area opening upwardly.

Rising from the center of the bottom portion 11 is a vertical cone 14 which extends to a determined height, and this cone is united to the pan 10 in any suitable manner.

Telescoped over the cone 14 is cylindrical body 15 forming a reservoir for feed to be delivered by gravity to poultry when feeding from the pan 10, the body being of a determined height and is removably seated upon a rest rack created by crossed wires 16 threaded horizontally through the cone 14, and having the downwardly inclined ends 17 which make contact with the wall 12 of the pan 10, and in this manner the lower open end of the body 15 is held elevated from the bottom portion 11 of the said pan 10, the body being of an outer diameter less than the inside diameter of the wall 12 to the pan, so that a feed space 18 exits concentrically about the body 15 to enable the poultry to consume the feed flowing within the pen therefrom by gravity.

The body 15 is open at its top and over the latter is arranged a conical shaped cover 19 which sheds water, sleet or the like from the pan 10 as well as from entry into the body 15. The cover 19 has within the same an attaching rim 20, which frictionally engages within the open top of the body 15 for holding the cover in position thereon, the feed being delivered into the body 15 through its open top on removal of the cover therefrom.

The rim 20 is fixed to the inner side of the cover 19 by tabs 21 which are attached in any suitable manner thereto.

The body 15 is preferably formed with securing ears 22, only one being shown in the drawing, and this ear has trained therethrough the wire 16 next thereto, so as to hold the pan 10 and the body 15 together in a unitary manner.

The pan 10, body 15 and the cover 19 are preferably made from sheet metal, cut and stamped or formed into the required shape, as will be clearly understood from the drawing.

The container as before described protects the feed therein and prevents the same from becoming contaminated with droppings from the poultry, as well as eliminating waste of the feed, the latter being at all times before the poultry for consumption thereof by the same.

What is claimed is:

A feeder of the character described, comprising a feed pan having an outwardly inclined upstanding side wall provided at its top edge with a narrow out-turned annular flange which lies in a horizontal plane when the pan is at rest with the top area opening upwardly, a vertical cone in the center of said pan and secured thereto, a cylindrical body over said vertical cone, crossed racking wires threaded horizontally through said cone, downwardly bent ends on the wires secured to the pan below the flange at its top edge thereof, said wires forming a rest for the cylindrical body to hold it elevated above the lowermost portion of the pan, a removable conical shaped cover fitting the top of the body and overlapping the perimeter of the pan to protect said pan from water and the like, a removable attaching rim at the upper end of said cylindrical body, and tabs on said rim secured to said cover whereby said cover is removably secured to said cylindrical body for replenishing the feed therein.

JOHN L. KWASH.

REFERENCES CITED

The following references are of record in the file of this patent:

UNITED STATES PATENTS

| Number | Name | Date |
|---|---|---|
| 582,410 | Young | May 11, 1897 |
| 664,984 | Torgerson | Jan. 1, 1901 |
| 985,201 | Owens | Feb. 28, 1911 |
| 1,200,892 | Shiffer | Oct. 10, 1916 |
| 1,497,596 | Scott | June 10, 1924 |
| 1,623,840 | Kassy | Apr. 5, 1927 |
| 2,383,732 | Niersbach | Aug. 28, 1945 |